(12) United States Patent
Gonzalez et al.

(10) Patent No.: US 7,527,738 B2
(45) Date of Patent: May 5, 2009

(54) METHOD AND APPARATUS FOR OIL SPILL CONTAINMENT

(75) Inventors: Luciano A. Gonzalez, Ancaster (CA); Blair F. Sim, Brampton (CA); Ron H. K. Tsang, Mississauga (CA); Alexander Z. Mlynarczyk, Toronto (CA)

(73) Assignee: Kinectrics Inc., Toronto, Ontario (CA)

( * ) Notice: Subject to any disclaimer, the term of this patent is extended or adjusted under 35 U.S.C. 154(b) by 0 days.

(21) Appl. No.: 10/689,937

(22) Filed: Oct. 21, 2003

(65) Prior Publication Data

US 2005/0082230 A1 Apr. 21, 2005

(51) Int. Cl.
C02F 1/28 (2006.01)

(52) U.S. Cl. .................. 210/690; 210/693; 210/747; 210/799; 210/170.01; 210/172.1; 210/283; 210/284; 210/924

(58) Field of Classification Search ................ 210/671, 210/680, 690, 693, 799, 242.4, 282, 924, 210/170.01, 172.1, 283, 284, 170.03, 747; 134/6, 7

See application file for complete search history.

(56) References Cited

U.S. PATENT DOCUMENTS

| | | | | |
|---|---|---|---|---|
| 3,565,257 A | * | 2/1971 | Cavalieri | 210/242.4 |
| 3,674,683 A | * | 7/1972 | Rainer | 210/693 |
| 3,980,153 A | | 9/1976 | Andrews | |
| 4,172,031 A | * | 10/1979 | Hall et al. | 210/679 |
| 4,189,310 A | * | 2/1980 | Hotta | 55/317 |
| 4,264,450 A | * | 4/1981 | Ayers et al. | 210/671 |
| 4,299,697 A | * | 11/1981 | Curati, Jr. | 210/170.09 |
| 5,108,614 A | * | 4/1992 | Ross et al. | 210/283 |
| 5,244,569 A | * | 9/1993 | Di Amico | 210/170.01 |
| 5,679,246 A | * | 10/1997 | Wilcox et al. | 210/165 |
| 5,686,696 A | * | 11/1997 | Baker et al. | 174/50 |
| 5,820,762 A | * | 10/1998 | Bamer et al. | 210/283 |
| 6,080,307 A | * | 6/2000 | Morris et al. | 210/283 |
| 6,485,639 B1 | * | 11/2002 | Gannon et al. | 210/164 |
| 6,503,390 B1 | * | 1/2003 | Gannon | 210/170.03 |

FOREIGN PATENT DOCUMENTS

| | | |
|---|---|---|
| CA | 2226014 | 6/1999 |
| EP | 0 395 223 A2 | 10/1990 |
| EP | 0 622 045 A1 | 11/1994 |

OTHER PUBLICATIONS

Website printout from www.kinectrics.com/en/TechProfiles-?SorbWeb.html last modified Jun. 29, 2004, pp. 1-2.
Canadian Trade Mark data: http://stragegis.ic.ca/SSG/1138/trdp113875000e.html, pp. 1-2, last modified Feb. 18, 2003.

* cited by examiner

*Primary Examiner*—Christopher Upton
(74) *Attorney, Agent, or Firm*—Panitch Schwarze Belisario & Nadel LLP

(57) ABSTRACT

An oil spill containment system for containing oil spills or leaks from an oil containing vessel. In one embodiment, the oil spill containment system comprises a geosynthetic material defining a number of cells, with an oil absorbing material and an oil adsorbing material received in the cells of the geosynthetic material. This system contains oil which spills or leaks from the oil containing vessel while allowing water from rain or snow melt to permeate through the system.

34 Claims, 3 Drawing Sheets

METHOD AND APPARATUS FOR OIL SPILL CONTAINMENT

FIELD OF THE INVENTION

The present invention relates to oil spill containment system, and more particularly to a method and apparatus for the containment of oil spills and leaks from oil containing equipment.

BACKGROUND OF THE INVENTION

Power transformers, capacitors, breakers and switches are electrical components extensively used by electrical utilities. With the notable exception of dry or gas-filled transformers, these electrical components typically contain insulating oil. Depending on the size of the electrical system, some of the transformers may contain several tens of thousand of liters of oil. As components of electrical transmission and distribution systems, these electrical components may be located within the limits of a transformer station, installed in remote locations, or located within a user's site or facility.

Despite rigorous design and operational maintenance programs, failures of these electrical components occur. Catastrophic failures may result in the spill of thousands of liters of oil with damaging consequences for the environment. Depending of the type of failure and the specific circumstances, the oil spill may be accompanied by a fire of the oil and possibly the equipment. Even if an electrical component does not catastrophically fail during its operational life, energy overloading and environmental condition cycles often cause chronic oil leaks in the electrical component. Because of the cost and need to maintain a reliable electrical supply for users, these leaks are rarely repaired. Thus, chronic leaks may cause prolonged damage to the environment. The sudden, large volume of oil following a failure of an electrical component or the small, but continuous stream of oil from a chronic leak may find its way into waterways or into the water table causing ground water contamination.

Environmental regulations, concerns of environmental groups, the large and increasing costs of soil remediation, and internal environmental policies are among many factors driving many companies to seek new solutions to address oil spills and flawed current management practices for chronic oil leaks. However, the number of options available is limited and available technologies are typically cost prohibitive and/or fail to provide adequate protection.

A known method of containing oil spills or leaks from electrical components is to use a concrete containment area under and/or around the protected equipment. This containment area is usually built with a water/oil separator used to separate rainfall or snow melt water collected in the containment area from the oil that might have leaked or spilled from the equipment. A drawback of this approach is that it is capital cost intensive and requires significant maintenance efforts to maintain the oil containment system effective.

Another method is to use an impermeable membrane within a concrete containment area. The membrane is supported by a concrete curb or other wall system to create a containment area with a volume sufficient to collect some or all of the oil in the electrical equipment in the event of a catastrophic failure. This approach has a number of drawbacks that may make it unreliable and ineffective. Firstly, sunlight may affect the membrane's long-term durability, creating cracks and changing its original oil resistant characteristics. Secondly, rainfall and snow melt water may collect in the containment area creating a hazardous condition. Thirdly, difficulties in sealing the containment system around cables and other protuberances from the equipment may result in oil leaks and improper containment. Fourthly, the high temperature that would be created by an oil fire would destroy the protective membrane.

Thus, in view of the drawbacks of the prior art, there remains a need for a more cost-effective and reliable apparatus for the containment of oil spills and chronic oil leaks from oil containing equipment.

SUMMARY OF THE INVENTION

The present invention provides an oil spill containment system and oil retention tray that obviates or mitigates one or more of the disadvantages of the prior art. In one embodiment, the present invention provides an oil spill containment system mechanism for quenching, suppressing or retarding a fire of oil from or spill or leak which has been collected by the system.

In accordance with one aspect of the present invention, there is provided an oil spill containment system for containing oil spills or leaks from an oil containing vessel, comprising: a layer of oil absorbing material; and a layer of oil adsorbing material covering said layer of oil absorbing material.

In accordance with another aspect of the present invention, there is provided an oil spill containment system for containing oil spills or leaks from an oil containing vessel, comprising: a support structure defining a plurality of cells; and an oil absorbing material received in the cells of said support structure.

In accordance with a further aspect of the present invention, there is provided an oil spill containment system for containing oil spills or leaks from an oil containing vessel, comprising: a geosynthetic material defining a plurality of cells, including; an oil absorbing material received in the cells of said geosynthetic material; and an oil adsorbing material received in the cells of said geosynthetic material; and a geotextile fabric covering said geosynthetic material, said geotextile fabric being permeable to oil and water.

In accordance with a yet further aspect of the present invention, there is provided an oil retention tray for containing oil spills or leaks from an oil containing vessel, comprising: an elongate tray having a mesh bottom and being open at the top thereof; a layer of oil absorbing material received on said mesh bottom; and a layer of oil adsorbing material covering said layer of oil absorbing material.

In accordance with a still further aspect of the present invention, there is provided a method of preparing an oil spill containment system for containing oil spills or leaks from an oil containing vessel, wherein the oil spill containment system is received in a containment basin beneath and around the oil containing vessel, the method comprising the steps of: forming a layer of oil absorbing material within the containment basin; and covering the layer of oil absorbing material with a layer of oil adsorbing material.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Similar references are used in different figures to denote similar components.

DETAILED DESCRIPTION

Figure 1:
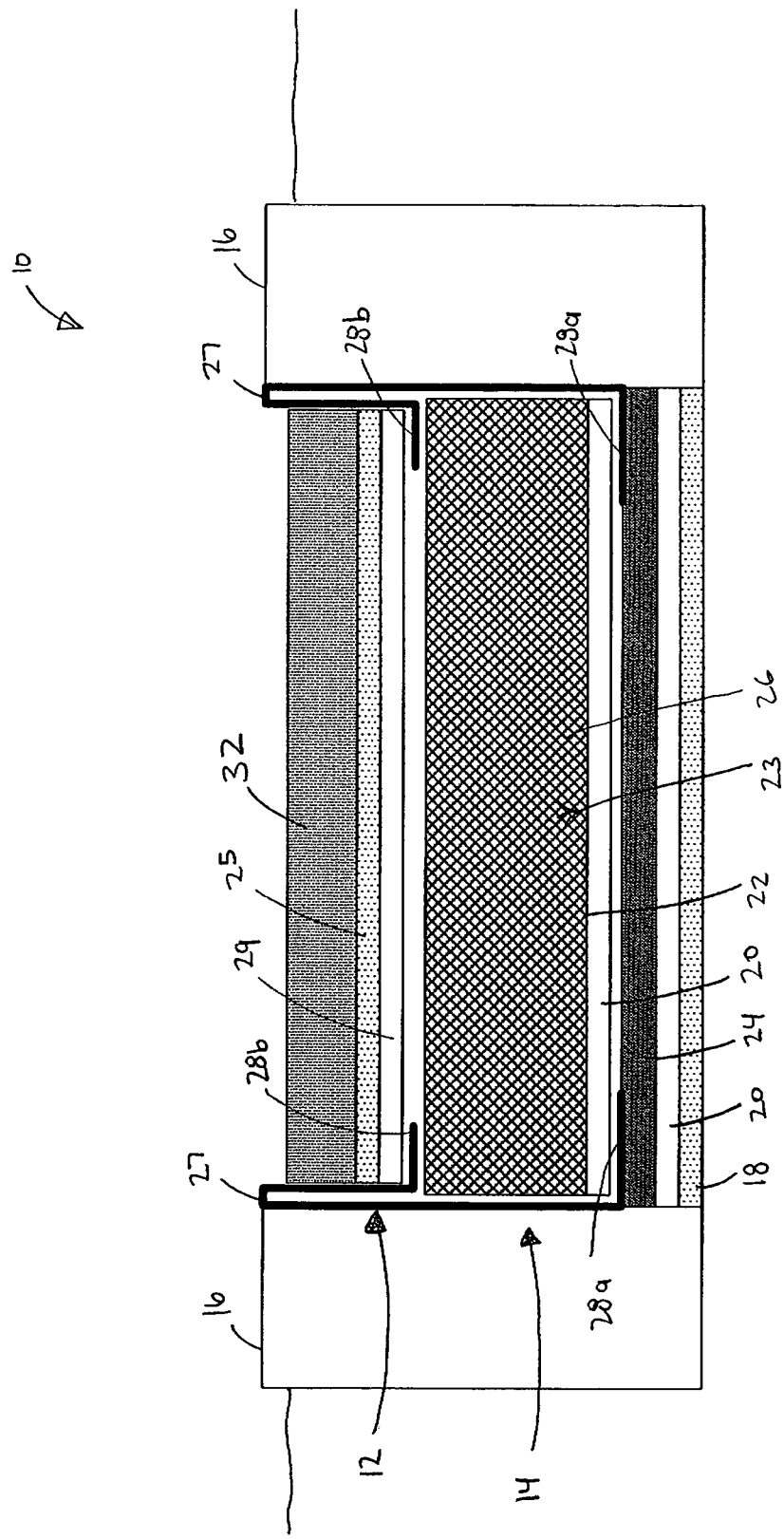
FIG. 1 is a sectional view of one embodiment of an oil spill containment system according to the present invention.
Figure 2:
FIG. 2 is a sectional view of a cell in the support structure of the oil spill containment system of FIG. 1 with oil adsorbing material received therein.

Reference is first made to FIG. 1, which shows one embodiment of an oil spill containment system 10 constructed according to the present invention. The system 10 comprises an upper section 12 and a lower section 14. The system 10 is received in a containment basin 16. In one embodiment, the containment basin 16 comprises a concrete retention wall which forms a containment area around and/or under oil containing equipment such as a transformer. The lower section 14 comprises a sand layer 18, an oil absorbing material such as an oil absorbing co-polymer 24, an oil and water permeable membrane or fabric 20 and an oil adsorbing layer including a support structure 22 defining a plurality of compartments or cells 23. An oil adsorbing material 26 and are received in the cells 23 of the support structure 22 (FIG. 2).

The sand layer 18 is laid down in the foundation of the containment basin 16. The sand layer 18 assists in draining water away from the foundation of the containment basin 16 and to smooth the foundation base. If desired, an aggregate material other than sand may be used provided it allows the drainage of water away from the oil spill containment system 10. The oil and water permeable membrane 20 is located above the sand layer 18 and surrounds the edges of the support structure 22. In one embodiment, the membrane 20 is a woven geotextile which provides structure and support to the lower section 14. In some embodiments, the membrane 20 is constructed of a durable material such as a polypropylene geotextile, and is resistant to biological degradation and naturally encountered chemicals, alkalis, and acids. An example of a suitable geotextile for the membrane 20 is the Mirafi™ 600X product from Ten Cate Nicolon (Pendergrass, Ga., USA).

The support structure 22 defines a number of cells 23 for receiving the oil adsorbing material 26. In some embodiments, the absorbent material 24 is not installed as a separate layer but is received on the bottom of the cells 23. In some embodiments, the support structure 22 is constructed of a geosynthetic material. A geosynthetic material is a synthetic material used for geotechnical engineering such as geomembranes, geotextiles, geonets, and geogrids. In one embodiment, the support structure 22 comprises a geosynthetic cellular confinement system such as the Geoweb™ product from Presto Products Company (Appleton, Wis., USA). In this embodiment, the oil absorbing material 24 and an oil adsorbing material 26 are received in the cells 23 of the support structure 22. In some embodiments, the oil absorbing material 24 is a granular polymer with oil absorbing properties. Preferably, the oil absorbing material 24 is unaffected or only minimally affected by water. More preferably, the oil absorbing material 24 is hydrophobic and repels water. In one embodiment, the oil absorbing material 24 comprises a hydrocarbon encapsulating co-polymer from CHEMTEX and the oil adsorbing material 26 comprises Peat Sorb™ from Zorbit Technologies Inc. (Mississauga, Ontario). CHEMTEX's co-polymer is unaffected by water and is capable of filtering and polishing organic hydrocarbons out of water, allowing rainwater and snow melt water that enters the system 10 to pass through. CHEMTEX's co-polymer works particularly well with hydrocarbon compounds. Other suitable oil absorbing materials 24 and oil adsorbing materials 26 may also be used, for example, Imbiber Beads™ from Imbibitive Technologies Canada Inc. (St. Catharines, Ontario) may be used as an oil absorbing material 24, while Roxul's DrainBoard™ rock wool may be used as an adsorbing material 26.

The upper section 12 comprises an impermeable liner 27 having ends 28 indicated individually by references 28a and 28b, a sand layer 25, an oil and water permeable membrane 29, and a fire retardant layer 32.

The impermeable liner 27 is impermeable to water and the oil contained in the oil containing equipment. The liner 27 is closely fitted to the interior of the containment basin 16 with the ends 28 extending into the containment area to prevent water and oil which leaks or spills from the oil containing equipment from flowing down the walls of the containment basin 16 and contaminating the ground. Sand layer 25 provides a smoothing effect on the surface of the oil and water permeable membrane 29. The oil and water permeable membrane 29 is similar to the membrane 20 of the lower section 14, and in some embodiments comprises the Mirafi™ 600X product from Ten Cate Nicolon (Pendergrass, Ga., USA). The fire retardant layer 32 comprises a material suitable for retarding or quenching a fire of the oil of the oil containing equipment. In some applications, the oil containing equipment may contain mineral oil. In such cases, the fire retardant layer 32 is selected to retard or suppress a fire of the mineral oil. In one embodiment, the fire retardant layer 32 comprises a layer of suitable crushed limestone. Other suitable fire retardant materials such as fire-quenching stones may also be used, if desired. More than one type of fire retardant material can be used in the fire retardant layer 32.

The construction of one example embodiment of the oil spill containment system 10 will now be briefly described. The oil spill containment system 10 is installed inside a containment area around and/or under oil containing electrical components such as transformers or other oil containing vessels. Prior to installation of the oil spill containment system 10, the containment area under the equipment to be protected is excavated, and the containment basin 16 is formed around the perimeter of the containment area. The containment basin 16 is typically formed of concrete, however other suitable materials may be used. Next, the impermeable membrane 27 is installed on the walls of the containment basin 16. The impermeable liner 27 is then folded along the top of containment basin 16 with the ends 28 hanging down the wall of containment basin 16.

After ensuring the containment area is properly leveled and built with the proper gradient, a layer of sand 18 is laid down in the foundation of the containment area to assist the drainage of water that may enter the system 10. Next, the oil and water permeable membrane 20 is laid down covering the sand layer 18. In the next step, a layer of oil absorbing material 24 is laid down to cover the containment area. The lower end 28a of the impermeable membrane 27 is placed on top of a portion of the oil absorbing material 24. Next an oil and water permeable membrane 20 is laid down to cover the oil absorbing material 24. In the next step, a support structure 22 comprising a layer of geosynthetic cells 23 is installed on top of the oil and water permeable membrane 20. The geosynthetic cells 23 are subsequently filled with an oil adsorbing material 26. The amount of oil absorbing material 24 and oil adsorbing material 26 to be installed depends on the total volume of oil to be contained, i.e. the volume of oil in the oil containing equipment, among other factors. The volume of the support structure 22 should be sufficient to hold the volume of oil in the equipment and the solid components of the oil containment system.

In the next step, the upper end 28b of the impermeable liner 27 is placed on top of the support structure 22. The upper and lower end 28 of the impermeable membrane 27 should be covering only a small fraction of the surface of the containment area to prevent the accumulation of water. Next, an oil and water permeable membrane 29 is installed on top of the support structure 22, covering the upper end 28b of the impermeable liner 27 the support structure 22. After the the oil and water permeable membrane 29 is laid down to cover the oil adsorbing material 34. The sand layer 25 is then installed. A layer of limestone 32 is then installed on top of the sand layer 25 to provide fire retardant properties to the system 10.

The layers of the oil adsorbing material, oil absorbing material, and the membranes can be installed in a number of configurations and using different types of materials to achieve similar results. Oil adsorbing materials that may be used for the support structures 22 include peat moss and derivatives thereof such as the Peat Sorb™ product from Zorbit Technologies Inc. (Mississauga, Ontario), Fuller's Earth, fly ash, rock wool and other solids that are capable of retaining organic liquids, including mineral oil and other dielectric insulating fluids. The oil adsorbing material 26 should allow water to permeate through the system 10. Oil absorbing materials that may be used for the oil containment system include CHEMTEX™ granular co-polymer, Imbiber Beads™ from Imbibitive Technologies Canada Inc. (St. Catharines, Ontario), and other solids capable of absorbing organic liquids, including mineral oil and other dielectric insulating fluids. The oil absorbing material 24 should be unaffected or only minimally affected by water and depending of its availability could be installed as a separate layer in the containment area or received on the bottom of the cells 23 of the support structure 22.

When an oil spill or leak occurs in the oil containing equipment, oil is temporarily trapped in the oil adsorbing material 26. The oil adsorbing layer captures the oil released until it becomes saturated. Additional amounts of oil released into the containment area travels through the saturated oil adsorbing material 26 reaching the oil absorbing material 24. Upon contact with the oil, the oil absorbing material 24 absorbs the oil forming an impermeable membrane. Additional oil released into the containment system 10 will be held by the impermeable layer formed between the absorbent material 24 and the oil.

When the oil absorbing material 24 absorbs oil it expands, forming a continuous layer of an oil and water impermeable membrane. In some embodiments, the oil absorbing material 24 expands to several times its initial volume. The oil absorbing material 24 releases little, if any, oil it has absorbed. CHEMTEX hydrocarbon encapsulating co-polymer typically will not release any absorbed liquid as a result of compression, gravitational pull, inclement weather, or being cut in half. In contrast, the oil adsorbing materials 26 will take-up oil and, if compressed, may slowly release it.

If the system has been installed for a long period of time and the transformer has been suffering a chronic leak, the top layer of the oil absorbing material 24 will eventually saturate, creating the impermeable layer and become unable to allow oil or water to go through. Water and further oil entering the system 10 cannot penetrate the impermeable membrane, and will collect upon its surface until removed. At this time, the oil adsorbing material 26 and the oil absorbing material 24, should be replaced to extend the useful life of the system 10.

Several variations of the oil spill containment system 10 are known. In some embodiments, the oil absorbing material 24 is not received in a support structure 22. In such cases, the oil absorbing material 24 may be evenly distributed to form a uniform layer of material, included in an absorbing pad, a filter pad, pillow, packet, or any other form such that a uniform distribution of the oil absorbing material 24 is provided. Similarly, in some embodiments the oil adsorbing material 26 is not received in a support structure, but is evenly distributed to form a uniform layer of material, included in an adsorbing pad, a filter pad, pillow, packet, or any other form such that a uniform distribution of the oil adsorbing material is provided. The sand layers 18 and 25 may be subsisted for another suitable aggregate, and may comprise the same or different type of aggregate.

Figure 4:
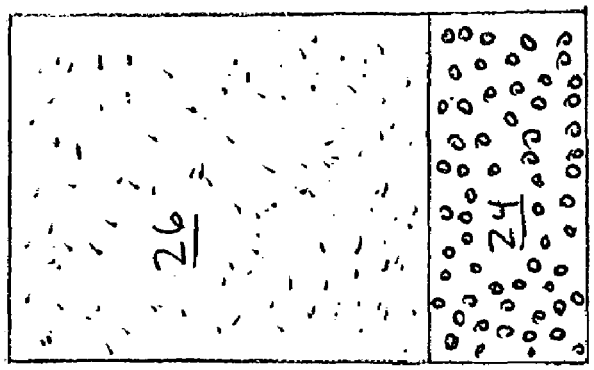
FIG. 4 is a sectional view of a cell in the support structure of the oil spill containment system of FIG. 3 with oil absorbing material and oil adsorbing material received therein.
Figure 3:
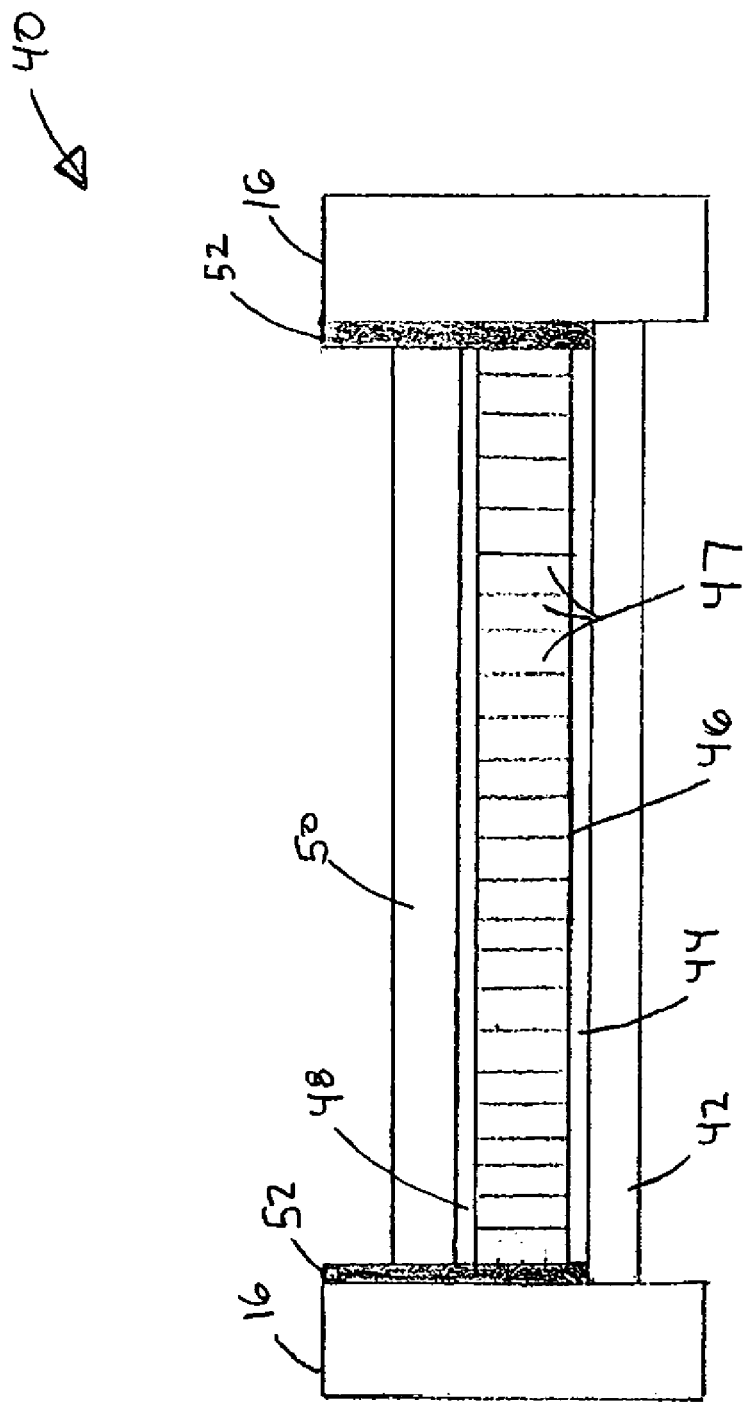
FIG. 3 is a sectional view of a second embodiment of an oil spill containment system according to the present invention.

Reference is next made to FIG. 3, which shows a second embodiment of an oil spill containment system 40 constructed according to the present invention. The system 40 comprises a sand layer 42, an oil and water permeable membrane 44, a support structure 46 defining a plurality of compartments or cells 47 containing the absorbent material 24 and the adsorbent material 26 (FIG. 4), a second oil and water permeable fabric 48, a fire retardant layer 50 such as limestone, and an impermeable liner 52. The oil spill containment system 40 is received in a containment basin 16 such as a concrete basin forming a containment area around and/or under oil containing equipment.

EXAMPLE 1

One example embodiment of an oil spill containment system constructed according to the present invention will now be described. The system in this example protects a transformer containing 12,000 liters of Voltesso 35 mineral oil. For this volume of oil, a containment area 8.5 meters long and 8.0 meters wide, and having a depth of 0.60 meters is excavated around and under the transformer. A containment basin 16 having retaining walls with a total height from the bottom of the excavated area of 0.70 m is built around the perimeter of the containment area. An impermeable liner 27 comprising a synthetic polymer is installed on the inside of the retaining walls.

The bottom of the containment basin 16 is then leveled off using sand. A 0.2 m high geosynthetic cell layer such as the Geoweb™ product from Presto Products Company (Appleton, Wis., USA) is then installed inside the containment basin 16, covering the bottom of the containment area. CHEMTEX™ granular co-polymer is then placed inside the geosynthetic cells to form an even layer of oil absorbing material approximately 0.05 m in height. Following the addition of the oil absorbing material, the geosynthetic cells are filled with Peat Sorb™. An oil and water permeable membrane is then installed on top of the filled geosynthetic cells. The membrane is then covered with crushed limestone leaving about 0.1 m of uncovered retaining wall.

Rainwater and snow melt water permeates through the oil spill containment system without accumulation. However, if oil has leaked out of the transformer the absorbing material will selectively remove the oil, allowing only water to pass through the system.

If the system has been installed for a long period of time and the transformer has been suffering a chronic leak, or the transformer has suffered a catastrophic failure releasing all the oil into the containment area, then the surface of the oil absorbing material will eventually saturate and become unable to allow the passage of rain water. When the absorbing layer becomes saturated, it forms an impermeable membrane that does not absorb any additional oil and is impermeable to water. Any water or additional oil entering the oil spill containment system will collect upon the impermeable membrane. At this stage, the oil absorbing and oil adsorbing layers, i.e. the filled geosynthetic cells, should be replaced to extend the useful life of the system.

EXAMPLE 2

A second example embodiment of an oil spill containment system and an oil retention tray constructed according to the present invention will now be described. The system in this example protects a transformer which contains 12,000 liters of Voltesso 35 mineral oil and is suffering from a chronic oil leak from a failed flange. The rate of the leak is about 20 liters of oil per year. The oil spill containment system is built the same way as explained in Example 1, however it also includes an oil retention tray capable of capturing the oil from the leak.

The oil retention tray includes a frame constructed of wood, metal or other suitable construction material. The tray is 2 m long, 3 m wide and 0.20 m in height. The top of the frame is open, and the bottom is covered with a metal mesh. The bottom metal mesh allows rain water to percolate through the tray. The bottom of the oil retention tray is covered by an oil and water permeable membrane The sides of the tray are covered by an oil and water impermeable membrane. On top of the oil and water permeable membrane a layer of an oil absorbing material is installed. A block of rock wool approximately 0.15 m in height is then placed inside the tray covering the oil absorbing material. An oil and water permeable membrane is then placed on top of the rock wool, covering the tray.

The foregoing arrangement will allow water to permeate through the oil spill containment system and oil retention tray, however leaking oil will be adsorbed by the rock wool. When the rock wool becomes saturated, the oil will seep down into the absorbing material. When the seeping oil comes into contact with the absorbing layer, the oil gets absorbed. Upon surface saturation of the oil absorbing layer, the oil and absorbing material form an impermeable membrane that does not absorb any additional oil and is impermeable to water. Any water or additional oil that enters the containment area will collect upon the impermeable membrane until it is removed. At this point, the oil retention tray should be replaced.

The present invention may used for the containment of oil spills or oil leaks from transformers, capacitors, switches, storage tanks and other stationary oil containing equipment. Use of the present invention in such applications will prevent or reduce ground water contamination by oil from an oil spill or leak from oil containing equipment.

Advantages of the various embodiments of the present invention, may include: pumping and monitoring of liquid levels within the containment area is not required; reliability and cost-effectiveness; the system does not accumulate water that may require pretreatment or testing before disposal; sealing around cables and other protuberances is not required; and reduced vapour release from the oil or other organic liquids absorbed by the containment system. Vapour release from the absorbed oil and other organic liquids is reduced by the present invention, thereby reducing the flammability/explosion and toxicity hazards presented by any oil or organic liquid which has leaked or spilled.

Although the present invention has been described with references to illustrative embodiments, it is to be understood that the invention is not limited to these precise embodiments, and that various changes and modifications may be effected therein by one skilled in the art. For example, substitution of membranes, adsorbent and/or absorbent materials for other liquids and chemicals which provide a suitable containment for such other liquids and chemicals may be made. All such changes and modifications are intention to be encompassed in the appended claims.

What is claimed is:

1. An oil spill containment system for containing oil spills or leaks from an oil containing vessel, comprising:
    a containment basin;
    a layer of oil absorbing material contained within said basin; and
    a layer of oil adsorbing material also contained within said containment basin, on top of said layer of oil absorbing material, wherein the oil adsorbing material is at least one selected from the group consisting of: peat moss and derivatives thereof, Fuller's Earth, fly ash, and rock wool, and wherein
    the layer of oil absorbing material, when saturated with oil, forms an oil-and-water-impermeable barrier.

2. The oil spill containment system as claimed in claim 1, wherein said layer of oil absorbing material comprises a material capable of encapsulating hydrocarbons and dielectric insulating fluids.

3. The oil spill containment system as claimed in claim 1, wherein said layer of oil adsorbing material comprises a solid capable of adsorbing or retaining mineral oil and other dielectric insulating fluids.

4. The oil spill containment system as claimed in claim 2, wherein said layer of oil absorbing material comprises a granular layer of an oil absorbing material and/or an absorbent pad containing the oil absorbing material.

5. The oil spill containment system as claimed in claim 1, further comprising a layer of fire retardant material covering said layer of oil adsorbing material.

6. The oil spill containment system as claimed in claim 5, further comprising an oil and water permeable membrane or fabric between said layer of oil adsorbing material and said layer of fire retardant material.

7. The oil spill containment system as claimed in claim 6, further comprising a layer of aggregate material positioned beneath said layer of oil absorbing material.

8. The oil spill containment system as claimed in claim 7, further comprising a water permeable membrane between said layer of oil absorbing material and said layer of aggregate material.

9. The oil spill containment system according to claim 5, wherein the oil absorbing material comprises an oil absorbing copolymer.

10. The oil spill containment system according to claim 1, wherein the oil absorbing material comprises an oil absorbing copolymer.

11. The oil spill containment system according to claim 1, wherein the oil absorbing material comprises a granular polymer with oil absorbing properties.

12. The oil spill containment system according to claim 1, further comprising a water permeable membrane or fabric between the layer of oil adsorbing material and the layer of oil absorbing material, wherein the water permeable membrane or fabric is in contact with the layer of oil adsorbing material and the layer of oil absorbing material.

13. The oil spill containment system according to claim 1, wherein the containment basin comprises concrete.

14. The oil spill containment system according to claim 1, further comprising a liner in the containment basin, the liner being impermeable to water and oil and extending partially between the layer of oil adsorbing material and the layer of oil absorbing material.

15. An oil retention tray for containing oil spills or leaks from an oil containing vessel, comprising:
   an elongate tray having a mesh bottom and being open at the top thereof;
   a layer of oil absorbing material received on said mesh bottom; and
   a layer of oil adsorbing material covering said layer of oil absorbing material, wherein the oil adsorbing material is at least one selected from the group consisting of: peat moss and derivatives thereof, Fuller's Earth, fly ash, and rock wool, and wherein
   the layer of oil absorbing material, when saturated with oil, forms an oil-and water-impermeable barrier.

16. The oil retention tray as claimed in claim 15, wherein said layer of oil absorbing material comprises an absorbent pad containing an oil absorbing granular polymer and/or an oil absorbing porous solid material.

17. The oil retention tray as claimed in claim 16, further comprising an oil and water permeable membrane or fabric covering said layer of oil adsorbing material, and an oil and water impermeable membrane covering the sides of said oil elongate tray.

18. The oil spill containment system as claimed in claim 17, further comprising a layer of fire retardant material covering said oil and water permeable membrane.

19. The oil retention tray according to claim 18, wherein the oil absorbing material comprises an oil absorbing copolymer.

20. The oil retention tray according to claim 15, wherein the oil absorbing material comprises an oil absorbing copolymer.

21. The oil retention tray according to claim 15, wherein the oil absorbing material comprises a granular polymer with oil absorbing properties.

22. The oil retention tray according to claim 15, further comprising a water permeable membrane or fabric between the layer of oil adsorbing material and the layer of oil absorbing material, wherein the water permeable membrane or fabric is in contact with the layer of oil adsorbing material and the layer of oil absorbing material.

23. The oil retention tray according to claim 15, further comprising a liner in the elongate tray, the liner being impermeable to water and oil and extending partially between the layer of oil adsorbing material and the layer of oil absorbing material.

24. A method of preparing an oil spill containment system for containing oil spills or leaks from an oil containing vessel, wherein the oil spill containment system is received in a containment basin, the method comprising the steps of:
   providing a layer of oil absorbing material within the containment basin; and
   providing a layer of oil adsorbing material on top of the layer of oil absorbing material within the containment basin, wherein the oil adsorbing material is at least one selected from the group consisting of: peat moss and derivatives thereof, Fuller's Earth, fly ash, and rock wool, and wherein
   the layer of oil absorbing material, when saturated with oil, forms an oil-and-water-impermeable barrier.

25. The method as claimed in claim 24, further comprising the step of covering the layer of oil adsorbing material with a layer of fire retardant material.

26. The method as claimed in claim 25, further comprising the step of, prior to the step of providing a layer of oil absorbing material within the containment basin, forming a layer of aggregate material on a foundation of the containment basin.

27. The method as claimed in claim 26, further comprising the step of covering the layer of aggregate material with a water permeable membrane.

28. The method of preparing an oil spill containment system according to claim 25, wherein the oil absorbing material comprises a an oil absorbing copolymer.

29. The method as claimed in claim 24, wherein the oil absorbing material comprises a material capable of encapsulating hydrocarbons and dielectric insulating fluids, and wherein the oil adsorbing material comprises a solid capable of retaining mineral oil and other dielectric insulating fluids.

30. The method of claim 24 wherein the containment basin is positioned beneath and around the oil containing vessel prior to the forming step.

31. The method of preparing an oil spill containment system according to claim 24, wherein the oil absorbing material comprises an oil absorbing copolymer.

32. The method of preparing an oil spill containment system according to claim 24, wherein the oil absorbing material comprises a granular polymer with oil absorbing properties.

33. The method of preparing an oil spill containment system according to claim 24, further comprising providing a water permeable membrane or fabric between the layer of oil adsorbing material and the layer of oil absorbing material, wherein the water permeable membrane or fabric is in contact with the layer of oil adsorbing material and the layer of oil absorbing material.

34. The method of preparing an oil spill containment system according to claim 24, further comprising providing a liner in the containment basin, the liner being impermeable to water and oil and extending partially between the layer of oil adsorbing material and the layer of oil absorbing material.

* * * * *